(12) United States Patent
Laverne

(10) Patent No.: US 12,710,771 B2
(45) Date of Patent: Aug. 18, 2026

(54) SYSTEMS, DEVICES, AND METHODS FOR DEPLOYING AUTONOMOUS EMERGENCY SIGNALING DRONES

(71) Applicant: Stack AV Co., Mount Pleasant, PA (US)

(72) Inventor: Michel Henri Joseph Laverne, Pittsburgh, PA (US)

(73) Assignee: Stack AV Co., Mount Pleasant, PA (US)

( * ) Notice: Subject to any disclaimer, the term of this patent is extended or adjusted under 35 U.S.C. 154(b) by 191 days.

(21) Appl. No.: 18/436,832

(22) Filed: Feb. 8, 2024

(65) Prior Publication Data

US 2025/0258503 A1 Aug. 14, 2025

(51) Int. Cl.

| | |
|---|---|
| ***G05D 1/69*** | (2024.01) |
| ***B60P 3/07*** | (2006.01) |
| ***G05D 1/24*** | (2024.01) |
| ***G05D 1/617*** | (2024.01) |
| ***G05D 105/55*** | (2024.01) |
| ***G05D 109/10*** | (2024.01) |
| ***H04W 4/46*** | (2018.01) |

(52) U.S. Cl.

CPC .................. *G05D 1/69* (2024.01); *B60P 3/07* (2013.01); *G05D 1/24* (2024.01); *G05D 1/619* (2024.01); *H04W 4/46* (2018.02); *G05D 2105/55* (2024.01); *G05D 2109/10* (2024.01)

(58) Field of Classification Search

None

See application file for complete search history.

(56) References Cited

U.S. PATENT DOCUMENTS

| | | | | |
|---|---|---|---|---|
| 10,496,107 | B2 * | 12/2019 | Pattison | G08G 5/57 |
| 11,995,999 | B2 * | 5/2024 | Madden | G08G 1/205 |
| 2023/0409054 | A1 * | 12/2023 | Bradley | G05D 1/106 |

* cited by examiner

*Primary Examiner* — Jason Holloway
*Assistant Examiner* — Christopher A Buksa
(74) *Attorney, Agent, or Firm* — Morrison & Foerster LLP

(57) ABSTRACT

A method for deploying a plurality of emergency signaling drones from a base vehicle includes detecting an emergency condition of the base vehicle; deploying the plurality of emergency signaling drones from the base vehicle based on the detected emergency condition; maneuvering the plurality of emergency signaling drones from the base vehicle to a respective plurality of signaling locations; and activating a plurality of emergency signaling assemblies on the plurality of emergency signaling drones to display an emergency signal at the respective plurality of signaling locations.

19 Claims, 4 Drawing Sheets

FIG. 2

SYSTEMS, DEVICES, AND METHODS FOR DEPLOYING AUTONOMOUS EMERGENCY SIGNALING DRONES

FIELD

This disclosure relates generally to emergency signaling drones and more specifically to deployable drones that work in unison to signal an emergency.

BACKGROUND

When vehicles stop on or alongside traveled roadways, for instance, due to failed vehicle components, they pose a traffic hazard. Other vehicles on the roadway may be traveling at high speed, and it may be difficult to identify and avoid a stopped vehicle without incident. To mitigate the hazards posed by such stopped vehicles, signals may be placed at various locations around the stopped vehicle to provide advance warning. In fact, in the United States, such emergency signals are required by 49 C.F.R. § 392.22, which dictates that whenever a commercial motor vehicle is stopped on a highway or its shoulder, warning devices are required to be placed in a specific layout and within a certain amount of time, which should not exceed 10 minutes. Such warning devices are traditionally positioned by the driver of the vehicle. However, as autonomous vehicles become more common on the roads, there may be no drivers available to position the required warning devices. Moreover, even if a vehicle is human operated, it can be dangerous for drivers to exit their vehicle on a highway to position such warning devices.

SUMMARY

Described herein are systems, devices, methods, and non-transitory computer-readable storage media for deploying a plurality of autonomous emergency signaling drones from a base vehicle, maneuvering the emergency signaling drones to a plurality of respective signaling locations around the base vehicle, and activating emergency signaling assemblies provided on each of the emergency signaling drones. Accordingly, exemplary systems and methods described herein may mitigate the dangers posed by stopped vehicles on a roadway and relieve drivers of human operated vehicles from the duty to put such warning devices in place.

An exemplary system includes a plurality of emergency signaling drones that may work in unison to automatically signal that a vehicle is disabled, damaged, or otherwise stopped along a roadway. The drones are deployed from a base vehicle upon detection of an emergency condition and automatically maneuvered to different locations to display respective emergency signals around the base vehicle to ensure that the emergency condition of the base vehicle is apparent to other vehicles. The emergency condition may include the base vehicle being stopped, for instance, at a location other than an approved stop location, and/or a failure of one or more components of the base vehicle. Each of the emergency signaling drones may autonomously maneuver to a respective signaling location using an onboard navigation system provided on each drone and/or may be maneuvered to a respective signaling location based on received navigation signals (e.g., from another drone or the base vehicle). Further, each of the emergency signaling drones may be configured to activate an emergency signaling assembly, which may include lights, flares, reflective surfaces, etc. configured to alert other vehicles on the roadway to the presence of a stopped vehicle hazard.

The systems, methods, devices, and non-transitory computer-readable storage media described herein provide a variety of technical advantages. For instance, exemplary systems and methods described herein enable autonomous commercial vehicles to comply with the requirements of 49 C.F.R. § 392.22 without requiring a human operator to remain onboard. Additionally, because the emergency signaling drones may be configured with onboard navigation systems enabling them to autonomously navigate to their assigned signaling locations, any human operator or driver that is onboard a vehicle storing the emergency signaling drones described herein may no longer need to exit their vehicle to ensure the emergency signaling drones reach their designated signaling locations. The placement is automated, thus providing for timely, accurate, and safe positioning of warning devices without requiring human intervention. Accordingly, the exemplary systems, methods, devices, etc. described herein also provide additional protections for drivers/operators of a base vehicle.

In some aspects, an exemplary method for deploying a plurality of emergency signaling drones from a base vehicle comprises: receiving an indication of an emergency condition of the base vehicle; deploying the plurality of emergency signaling drones from the base vehicle based on the emergency condition; maneuvering the plurality of emergency signaling drones from the base vehicle to a respective plurality of signaling locations; and activating a plurality of emergency signaling assemblies on the plurality of emergency signaling drones to display an emergency signal at the respective plurality of signaling locations.

Optionally, the plurality of signaling locations are determined based on a stop location of the base vehicle.

Optionally, each of the plurality of emergency signaling drones is configured to maneuver to a predefined signaling location of the determined plurality of signaling locations using an onboard navigation system.

Optionally, the plurality of emergency signaling drones are configured to navigate to one of the plurality of signaling locations based on a local map and localization information received from the base vehicle using an onboard navigation system.

Optionally, an emergency signaling drone of the plurality of emergency signaling drones is a master signaling drone configured to transmit navigation instructions to one or more other emergency signaling drones of the plurality of emergency signaling drones.

Optionally, the master signaling drone is configured to determine the navigation instructions based on sensory information obtained using one or more sensors on the master signaling drone.

Optionally, the method includes: receiving an indication of a secondary emergency condition of one or more of the plurality of emergency signaling drones; and deploying one or more additional emergency signaling drones from the base vehicle to replace the one or more emergency signaling drones experiencing the secondary emergency condition.

Optionally, the secondary emergency condition comprises one or more of the emergency signaling drones not being capable of activating an emergency signaling assembly of the plurality of emergency signaling assemblies.

Optionally, the emergency condition comprises the base vehicle being stopped at a location of a roadway other than one or more approved stop locations, a failure of one or more components of the base vehicle, or any combination thereof.

Optionally, the emergency condition is detected by one or more fault detection sensors on the base vehicle.

Optionally, the indication of the emergency condition is based on an input received from an operator of the base vehicle. Optionally, the base vehicle is an autonomous vehicle or a human operated vehicle.

Optionally, the plurality of emergency signaling drones comprise a plurality of autonomous drones stored on the base vehicle.

Optionally, activating the plurality of emergency signaling assemblies on the plurality of emergency signaling drones comprises activating at least one light on each of the emergency signaling assemblies.

Optionally, the plurality of emergency signaling drones are configured to enter a low-power mode upon activating the plurality of emergency signaling assemblies.

Optionally, entering the low-power mode comprises disabling one or more systems of the plurality of emergency signaling drones other than the emergency signaling assembly.

Optionally, a communication link communicatively coupling at least one of the plurality of emergency signaling drones with the base vehicle is maintained in the low-power mode.

Optionally, a communication link communicatively coupling each of the plurality of emergency signaling drones to one another is maintained in the low-power mode.

In some aspects, a system for deploying a plurality of emergency signaling drones from a base vehicle comprises one or more processors and memory storing one or more computer programs that include computer instructions, which when executed by the one or more processors, cause the system to: receive an indication of an emergency condition of the base vehicle; deploy the plurality of emergency signaling drones from the base vehicle based on the emergency condition; maneuver the plurality of emergency signaling drones from the base vehicle to a respective plurality of signaling locations; and activate a plurality of emergency signaling assemblies on the plurality of emergency signaling drones to display an emergency signal at the respective plurality of signaling locations.

In some aspects, a non-transitory computer readable storage medium stores instructions for deploying a plurality of emergency signaling drones from a base vehicle, the instructions configured to be executed by one or more processors of a computing system to cause the system to: receive an indication of an emergency condition of the base vehicle; deploy the plurality of emergency signaling drones from the base vehicle based on the emergency condition; maneuver the plurality of emergency signaling drones from the base vehicle to a respective plurality of signaling locations; and activate a plurality of emergency signaling assemblies on the plurality of emergency signaling drones to display an emergency signal at the respective plurality of signaling locations.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

A better understanding of the features and advantages of the present disclosure will be obtained by reference to the following detailed description that sets forth illustrative embodiments, in which the principles of the disclosure are utilized, and the accompanying drawings of which:

FIG. 2 illustrates an exemplary block diagram of an autonomous emergency signaling drone according to some embodiments.

DETAILED DESCRIPTION

Figure 1:
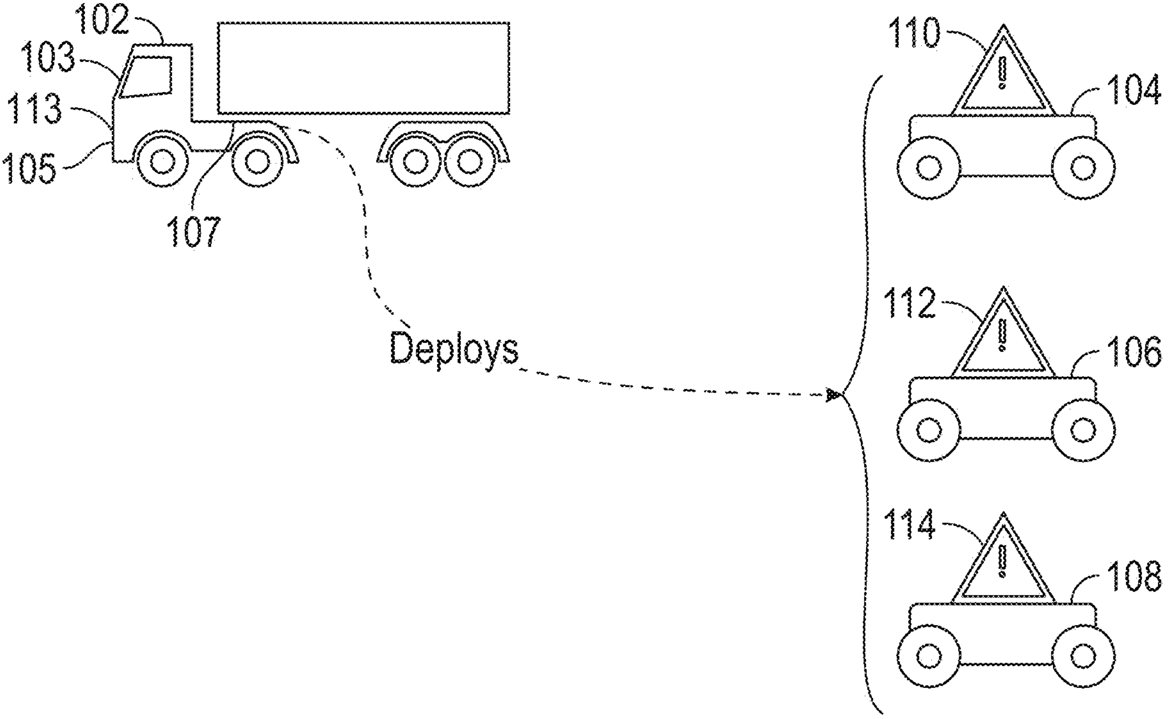
FIG. 1 illustrates an exemplary system for deploying a plurality of autonomous emergency signaling drones from a base vehicle according to some embodiments.

Described herein are systems, devices, methods, and non-transitory computer-readable storage media for deploying a plurality of autonomous emergency signaling drones from a base vehicle. Upon deployment, the emergency signaling drones maneuver to respective signaling locations, and emergency signaling assemblies provided on each of the emergency signaling drones may be activated. The emergency signaling drones may be relatively small ground-based and/or aerial drones configured to be stored on, and released from, the base vehicle, and the emergency signaling assemblies may be positioned on the drone to provide a warning to vehicles that the base vehicle is stopped on a roadway at a certain distance from the emergency signaling drone, thus allowing the other vehicles to avoid any hazardous condition posed by the stopped base vehicle.

According to some embodiments, an exemplary system may include a controller that receives information about the status of the base vehicle based on sensor data from one or more sensors (e.g., fault detection sensors) on the base vehicle configured to collect data to enable the system to detect an emergency condition of the base vehicle. The emergency condition may be, for instance, a failure of a vehicle component and/or that the base vehicle is stopped at a location on a roadway other than an approved stop location. Upon receipt of an indication of an emergency condition, the emergency signaling drones may be automatically activated and deployed from the base vehicle. In some embodiments, the signal indicating an emergency condition is received from a computing system of the base vehicle, directly from sensors on the base vehicle, or a remote server monitoring the base vehicle's condition. In some embodiments, one or more of the emergency signaling drones may be deployed if data from the base vehicle is no longer being received, for instance, due to a total system failure of the base vehicle.

Following deployment, each of the emergency signaling drones may navigate to a respective signaling location of a plurality of signaling locations using a navigation system onboard each of the drones and activate an emergency signaling assembly. The plurality of emergency signaling locations may be determined based on one or more characteristics of the roadway on which the base vehicle is stopped. The plurality of emergency signaling locations may include a first set of signaling locations which may be applicable, for instance, if the base vehicle is stopped upon the traveled portion or the shoulder of a divided or one-way highway. The plurality of emergency signaling locations may include a second set of signaling locations which may be applicable, for instance, if the base vehicle is stopped within 500 feet of a curve, a crest of a hill, or another obstruction to view, and the plurality of emergency signaling locations may include a third set of signaling locations which may be applicable to any conditions not described above with respect to the first and second sets. The applicable set of signaling locations may be determined (e.g., by the base vehicle, a remote server, and/or at least one of the emergency signaling drones) based sensor data acquired by perception sensors onboard the base vehicle and/or the emergency signaling drones, and the emergency signaling drones may be configured to reach their respective signaling location within a predefined time period, such as 10 minutes.

In some embodiments, the emergency signaling drones may autonomously maneuver from the base vehicle to their respective signaling location using perception sensor data obtained using perception sensors onboard each of the emergency signaling drones and/or based on sensor information from the base vehicle. In some embodiments, the base vehicle may transmit a local map and localization information to one or more of the emergency signaling drones. The local map may include a geographic map including roadways, landmarks, buildings, etc. in proximity to the base vehicle determined based on GPS data of the base vehicle. The localization may include the position of the base vehicle within its environment and may be determined based on perception sensor data acquired using one or more perception sensors on the base vehicle. Based on the local map and/or localization, each of the emergency signaling drones may utilize their respective onboard navigation system to determine a navigation path and maneuver to one of the plurality of different signaling locations. In some embodiments, the base vehicle may not provide some or all of the information described above, such as the localization and local map (e.g., due to sensor/communications system failures), and the emergency signaling vehicles may navigate to their respective signaling location using only their onboard navigation systems.

In some embodiments, the base vehicle may be configured to at least partially control one or more of the emergency signaling drones to maneuver the one or more drones to a respective signaling location. The base vehicle may determine the applicable set of signaling locations, assign the signaling drones to respective locations, and/or control the onboard navigation system on each drone to maneuver it to a respective signaling location. In some embodiments, one of the emergency signaling drones may act as a master signaling drone and the remaining emergency signaling drones act as slave signaling drones configured to be controlled (e.g., partially or fully) by the master signaling drone. As master signaling drone, the emergency signaling drone may serve as the main point of contact with the base vehicle and/or a remote server. In some embodiments, the master signaling vehicle may exert some degree of control over the remaining emergency signaling drones (e.g., the slave signaling drones). The master signaling drone may be responsible for determining an applicable set of signaling locations, for instance, based on perception sensor data it collects using onboard sensors or based on the localization and/or local map from the base vehicle and may transmit an indication of the applicable set to the slave signaling drones. The master signaling drone may be configured to dynamically assign slave signaling drones to a respective signaling location (e.g., of an applicable set of signaling locations) and may be configured to transmit navigation instructions to the slave signaling drones.

Each of the deployed emergency signaling drones may be configured to activate an emergency signaling assembly at their respective signaling locations. The signaling assemblies may be activated immediately upon deployment, in transit to the signaling location, and/or upon reaching the signaling location. The emergency signaling assembly may include one or more visual and/or auditory signaling mechanisms, such as lights, flares, reflective surfaces, sirens, etc. The emergency signaling assemblies may serve to alert other vehicles (and drivers) on the road of a stopped vehicle at a certain distance away from the emergency signaling assembly. Thus, the signaling assemblies can help to avert crashes and other incidents that may result from a stopped vehicle on a roadway with high-speed traffic. While the emergency signaling assemblies are being deployed, the emergency signaling drones may enter a low-power mode, deactivating one or more other systems, such as the navigation system, and wait for a signal to return to the base vehicle. Upon receiving a return signal, the emergency signaling drones may utilize their onboard navigation systems to maneuver back to the base vehicle and back into the storage compartment.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, storage medium, such as, but not limited to, any type of disk, including floppy disks, USB flash drives, external hard drives, optical disks, CD-ROMs, magneto-optical disks, read-only memories (ROMs), random access memories (RAMs), EPROMS, EEPROMs, magnetic or optical cards, application-specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear in the description below. In addition, the present invention is not described with reference to any particular programming language. It will be appreciated that a variety of programming languages may be used to implement the teachings of the present disclosure as described herein.

FIG. 1 illustrates an exemplary system 100 for deploying a plurality of emergency signaling drones from a base vehicle, according to some embodiments. System 100 may include a base vehicle 102 which may be a commercial vehicle, such as a commercial truck (e.g., a semi-truck or tractor-trailer), and in some embodiments may be an autonomous vehicle such as an autonomous semi-truck. As described above, when commercial trucks stop on the roadway, for instance, due to a failed component of the vehicle, etc., truck drivers may be required by law to place emergency signals such as flares, reflectors, or other signaling mechanisms at predefined distances from the vehicle. Because autonomous trucks may not have a human operator aboard and may still encounter conditions requiring a stop along the roadway, a system may be needed that can enable positioning of the emergency signaling devices at the required locations. Accordingly, system 100 may include a plurality of emergency signaling drones 104, 106, and 108 that are configured to be stored in or on and deployed from the base vehicle 102. Each of the emergency signaling drones may be an autonomous ground-based and/or aerial vehicle configured to maneuver to a particular signaling location, which may be a particular location at a predefined distance from the base vehicle when the base vehicle is stopped, and to activate a respective emergency signaling assembly 110, 112, or 114. While system 100 is described with reference to three emergency signaling drones, one skilled in the art would understand that additional or fewer emergency signaling drones may be included in the system.

Emergency conditions may be detected by one or more fault detection sensors 103 and/or perception sensors 113 provided on base vehicle 102 configured to detect when the base vehicle 102 is experiencing an emergency condition that may require deployment of the plurality of emergency signaling drones 104, 106, and 108. The fault detection sensors 103 and perception sensors 112 may be communicatively coupled to a computing system 105 of base vehicle 102 which may be configured to detect various different emergency conditions, which may include failures of vehicle components and/or the vehicle being stopped at a location other than an approved stop location.

As used herein, fault detection sensors 103 may broadly include any sensor capable of detecting a fault condition that may trigger deployment of the plurality of emergency signaling drones from the base vehicle 102. The fault detection sensors 103 may include, for instance, sensors configured to detect faults of perception sensors, electrical components, mechanical components, and so on. Accordingly, the fault detection sensors may detect faults based on perception data acquired by perception sensors 113 positioned on the base vehicle (e.g., camera, LIDAR, and radar. The fault detection sensors may also include sensors for detecting failures of components of the base vehicle 102, which may constitute an emergency condition. The failure of one or more components of the base vehicle may include a sensor failure, a software failure, a communications link failure, a mechanical failure, an electrical failure, or any combination thereof. Sensor failures, for instance, may include obstruction of a sensor, physical damage to a sensor, sensor fusion error, adverse weather conditions, etc. Software failures, for instance, may include object detection errors, algorithmic limitations, GPS or other navigation system errors, etc. Mechanical failures may include, for instance, flat tires, brake malfunctions, axle damage, etc. Electrical failures may include, for instance, short circuits, dead batteries, etc. One skilled in the art would understand that the aforementioned component errors are meant to be exemplary and a variety of other component errors may form part of an emergency condition detected by the base vehicle.

The perception sensors 113 may detect, for instance, when the base vehicle is stopped at a location in which the emergency signaling drones should be deployed. An emergency condition may not always be detected when the base vehicle is stopped, but an emergency condition may be detected when the base vehicle is stopped at a location on a roadway other than one or more approved stop locations. The one or more approved stop locations may include a traffic signal location, an origin location, a destination location, a parking lot, a charging station, a refueling location, a rest area, a weigh station, a toll booth, a toll station, and/or a border crossing. It should be understood that the aforementioned approved stop locations are exemplary and not meant to be limiting. In some examples, the base vehicle may be configured to dynamically determine whether it is stopped at an approved stop location based on a variety of conditions (e.g., road conditions, traffic conditions, and so on). In some embodiments, the approved stop locations may include any stop locations within the business or residential district of a municipality, except during the time lighted lamps are required and when street or highway lighting is insufficient to make a commercial motor vehicle clearly discernable at a distance of 500 feet to persons on the highway. As noted, one or more perception sensors 113 may include, for instance, cameras, radar, LIDAR, inertial measurement sensors, GPS sensors, etc. Computing system 105 may process perception data (e.g., using GPS data, object detection algorithms or other computer vision/machine learning algorithms) determine whether the base vehicle 102 is stopped at an approved stop location.

Accordingly, if the perception sensors 113 detect the base vehicle is stopped, and optionally if the fault detection sensors 103 detect a failure of one or more components of the base vehicle 102, then the computing system 105 may detect an emergency condition. If the computing system 105 detects a failure of one or more components of the base vehicle based on signals from the fault detection sensors 103 and the vehicle is stopped at an approved stop location, the computing system 105 may still detect an emergency condition based on the failed component of the vehicle. If the base vehicle 102 is traveling and detects a failure of one or more components of the base vehicle 102 using fault detection sensors 103, the computing system 105 may cause the vehicle to initiate a vehicle stop sequence when the base vehicle 102 is an autonomous vehicle such as a fully autonomous vehicle or partially autonomous vehicle (or, if the vehicle is human operated, instruct an operator of the vehicle to stop the vehicle). The vehicle stop sequence may include identifying a safe stop location. The stop location may be a road shoulder, an adjacent lane, a current travel lane, or any other location the system determines is a safe stop location. The computing system 105 may then cause the base vehicle 102 to navigate to and stop at the identified safe stop location or instruct the operator to navigate to the approved stop location.

The computing system 105 may additionally, or alternatively, be configured to detect an emergency condition based on an input received from an operator of the base vehicle 102 (e.g., in embodiments where the base vehicle is either human operated or communicatively coupled to a remote central control system). For example, an operator located either within the base vehicle 102 or at a remote location away from the base vehicle 102 (e.g., a control station for a fleet of autonomous vehicles), may provide an input via an interface associated with the computing system 105. The input may be indicative of an emergency condition of the base vehicle 102. For instance, the input may cause activation of the hazard lights of the base vehicle 102. The input may cause the computing system 105 to detect an emergency condition even in the absence of the base vehicle 102 being stopped at a location other than an approved stop location and/or a failure of one or more components of the base vehicle 102. Upon detection of the emergency condition, computing system 105 of the base vehicle 102 may transmit a deployment signal using one or more communication devices included in the computing system 105 to one or more of the emergency signaling drones 104, 106, and 108.

While base vehicle 102 is described as a part of system 100 with reference to FIG. 1, this is not a requirement. Emergency signaling drones 104, 106, and 108 may form part of an off-the-shelf emergency signaling system. The drones may be stored on any vehicle and deployed upon detection of or receipt of a signal indicating an emergency condition. In some embodiments, the fault detection sensors 103 and perception sensors 112 may form part of an off-the-shelf emergency signaling system.

The plurality of autonomous emergency signaling drones may include at least one of autonomous ground-based vehicles and autonomous aerial vehicles. As shown in FIG. 1, the drone can be a ground vehicle such as a wheeled drone, tracked drone, legged drone. In some embodiments, the drones are flying vehicles, for example, multi-rotor drones, single-rotor drones, fixed-wing drones, fixed-wing hybrid vertical take-off and landing drones, or any other autonomous vehicle configured to be stored in or on the base vehicle, for instance, in storage compartment 107.

Storage compartment 107 may be integral to the base vehicle 102 or may form part of the off-the-shelf emergency signaling system described above and be configured to be mounted on the base vehicle 102. The storage compartment 107 may be positioned underneath a tractor of the base vehicle 102, above a tractor of the base vehicle, in a cabin of the base vehicle, on a roof of the base vehicle, or in a fairing of the base vehicle. More than one storage compartment 107 may be provided on the base vehicle 102. For example, multiple emergency signaling drones (e.g., 104, 106, and 108) may be stored within the same storage compartment, or each emergency signaling drone may be stored in a separate storage compartment. One or more emergency signaling drones may additionally, or alternatively, be mounted on an external surface of the base vehicle 102 (e.g., on the roof of the cabin of an autonomous semi-truck or the roof of any other autonomous vehicle, on the chassis (or otherwise on the undercarriage of the vehicle), or otherwise mounted on the vehicle in a manner other than within a storage compartment 107.

While stored in the storage compartment 107, or otherwise mounted to the base vehicle 102, the emergency signaling drones 104, 106, and 108 may be connected to electrical power to charge the respective drones. For instance, in a gas-powered vehicle, electrical power to charge the drones may be drawn from the vehicle's alternator while the vehicle is running, and in an electric vehicle the electrical power may be drawn from the vehicles battery pack. Although, the charging power could also be drawn from the battery of a gas-powered vehicle.

Deploying the plurality of emergency signaling drones from the base vehicle may include releasing the plurality of emergency signaling drones from the storage compartment 107, for instance, by lowering a ramp from the storage compartment 107, and/or opening a door of the storage compartment 107, or otherwise releasing the emergency signaling drones from the storage compartment 107 of the base vehicle. The base vehicle computing system 105 (and/or the emergency signaling drones 104, 106, and 108 themselves) may configured to automatically deploy the emergency signaling drones 104, 106, and 108 upon detection of the emergency condition. For instance, the base vehicle computing system 105 and/or emergency signaling drones 104, 106, and 108 may transmit a signal to a controller controlling an actuator of the storage compartment 107 instructing the compartment to open to release the emergency signaling drones. The base vehicle computing system 105 may additionally send a signal to the emergency signaling drones 104, 106, and 108 upon detection of the emergency condition instructing them to deploy from the base vehicle 102 and/or the storage compartment 107.

Once deployed, the emergency signaling drones 104, 106, and 108 may maneuver from the base vehicle to a respective plurality of signaling locations. The plurality of signaling locations may be determined based upon a location of the base vehicle 102 and/or may include a plurality of locations at a plurality of predefined distances from the base vehicle 102. For instance, the plurality of signaling locations may include a first signaling location at a predefined distance in front of the base vehicle, a second signaling location at a first predefined distance behind the base vehicle, and a third signaling location at a second predefined distance behind the base vehicle.

The plurality of emergency signaling locations may also be determined based on one or more characteristics of the roadway on which the base vehicle is stopped. The plurality of emergency signaling locations may include a first set of signaling locations which may be applicable to a first set of road characteristics, for instance, if the base vehicle is stopped upon the traveled portion or the shoulder of a divided or one-way highway. The first set may include, for instance, a signaling location at a distance of 200 feet in the direction toward approaching traffic (i.e., behind the vehicle) and a signaling location at a distance of 100 feet in a direction toward approaching traffic (i.e., behind the vehicle) in the center of the lane or shoulder occupied by the base vehicle. Additionally, the plurality of signaling locations may include a signaling location on the traffic side of the base vehicle within 10 feet of the rear of the base vehicle.

The plurality of emergency signaling locations may include a second set of signaling locations which may be applicable to a second set of road characteristics, for instance, if the base vehicle 102 is stopped within 500 feet of a curve, a crest of a hill, or another obstruction to view. The second set may include, for instance, a location in the direction of the obstruction to view a distance of 100 feet to 500 feet from the stopped base vehicle so as to afford ample warning to other users of the highway. The second set may also include locations at one or more of the locations from the first set, described above, and the third set, described below.

The plurality of emergency signaling locations may include a third set of signaling locations which may be applicable to a third set of road characteristics, which may include any conditions not described above with respect to the first and second sets. The third set may include, for instance, (i) a signaling location on the traffic side of, and 4 paces (approximately 3 meters or 10 feet) from, the stopped base vehicle 102 in the direction of approaching traffic; (ii) a signaling location at 40 paces (approximately 30 meters or 100 feet) from the base vehicle 102 in the center of the traffic lane or shoulder occupied by the base vehicle 102 and in the direction of approaching traffic; and (iii) a signaling location at 40 paces (approximately 30 meters or 100 feet) from the stopped base vehicle 102 in the center of the traffic lane or shoulder occupied by the base vehicle 102 and in the direction away from approaching traffic.

Figure 2:
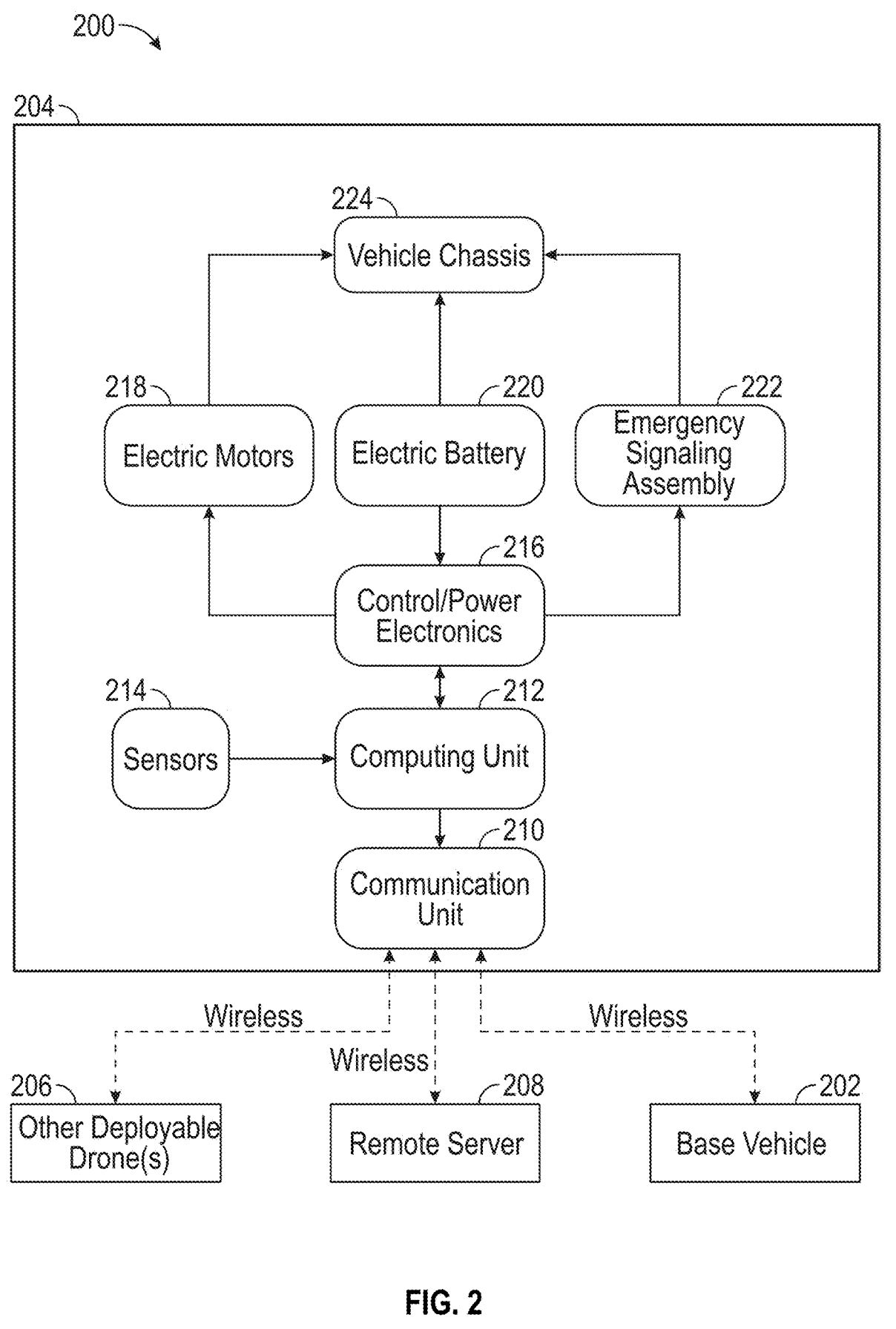

Each of the plurality of emergency signaling drones 104, 106, and 108 may include a respective onboard navigation system including sensors, a computing unit, a communications unit, and a control/power electronics unit (along with a motor or motors, a battery or batteries, and other components which one skilled in the art would readily understand may be included to enable an autonomous drone to maneuver to a predefined location, e.g., as shown in additional detail in FIG. 2). The one or more sensors include a LIDAR sensor, a radar sensor, an infrared sensor, a GPS sensor, an inertial measurement unit (IMU) sensor, a camera, or any combination thereof. Sensor data from the sensors may be transmitted (e.g., via wired or wireless communication protocols) to the onboard computing system(s) which may in turn transmit commands to a control/power electronics unit to control the respective emergency signaling drone. Each onboard navigation system may be configured to enable the emergency signaling drone to maneuver from the base vehicle to one of a plurality of signaling locations.

As described above, to assist the emergency signaling drones 104, 106, and 108 to maneuver to their respective predefined signaling location, the base vehicle 102 may transmit (e.g., through wireless communication) the latest known local map and localization of the base vehicle 102. Localization of the base vehicle 102 may include the position of the base vehicle within its environment (e.g., relative to one or more objects detected using sensors of the base vehicle). For instance, the localization may indicate that the base vehicle 102 is positioned in a center lane traveling on a three-lane highway with one or more vehicles approaching from behind the base vehicle, or that the base vehicle is positioned on a highway shoulder with a particular amount of spacing between the base vehicle and the active travel lanes of an adjacent highway. It should be understood that these examples of the localization are not meant to be limiting, but rather to illustrate that the localization may include any variety of information available to the base vehicle about its environment. The local map may indicate the base vehicle's geographic location (e.g., on a map including the roadway) and may be determined based on GPS sensor data. The base vehicle 102 may be configured to periodically transmit the local map and localization information at a series of predetermined time intervals such that the emergency signaling drones may have a relatively up-to-date local map and localization of the base vehicle 102 regardless of whether the emergency condition renders the base vehicle 102 incapable of transmitting the local map and localization information once the base vehicle is stopped. For instance, the base vehicle 102 may be configured to transmit the local map and localization information at least every millisecond, every second, every 5 seconds, every 10 seconds, or any other predefined time interval. The local map and localization information from the base vehicle 102 may be generated using sensor data obtained by one or more perception sensors 113 on the base vehicle. In some embodiments, an emergency condition may be detected by the emergency signaling drones if the periodically transmitted local map and localization information is not received for a predefined time period.

The information transmitted from the base vehicle 102 may include an applicable set of signaling locations (e.g., of the first, second, and third sets of signaling locations described above) and/or instructions assigning each of the emergency signaling drones 104, 106, and 108 to one of the respective signaling locations. As described above, the applicable set of signaling locations may be determined by the base vehicle 102 (and/or by one or more of the emergency signaling drones 104, 106, and 108) based on characteristics of the roadway, which may be detected by sensors onboard the base vehicle 102 and/or sensors onboard the emergency signaling drone(s) 104, 106, and/or 108. The emergency signaling drones 104, 106, and 108 may each be configured to maneuver to one of the signaling locations based on the applicable set of signaling locations transmitted by the base vehicle 102. In some embodiments, the applicable set of signaling locations may be determined by one or more of the emergency signaling drones 104, 106, and 108 themselves based on localization and local map transmitted from the base vehicle. In some embodiments, the emergency signaling drones may be configured to autonomously maneuver to their respective signaling locations, for instance, based on the local map and localization from the base vehicle 102 and/or based on sensor data obtained via onboard sensors of one or more of the emergency signaling drones 104, 106, and 108 using their onboard navigation systems. In some embodiments, the base vehicle may at least partially control (e.g., transmit control signals to) one or more of the emergency signaling drones 104, 106, and 108 to maneuver them to a respective signaling location. The base vehicle may transmit navigation instructions to one or more of the emergency signaling drones that include a predefined path to the signaling location, a travel velocity, and/or a permissible range of deviation from the predefined path (e.g., to avoid obstacles such as other vehicles on the road and/or to stay within a lane).

If the base vehicle 102 is unable to transmit the local map, localization information, information associated with the applicable set of signaling locations to the emergency signaling drones, and/or navigation instructions (e.g., due to the severity of the failure on the base vehicle), the emergency signaling drones 104, 106, and 108 may be configured to determine which set of signaling locations is applicable and maneuver to their respective signaling locations using their onboard sensing and computing resources. For instance, the plurality of emergency signaling drones 104, 106, and 108 may be configured to perform their own localization upon deployment (e.g., to determine their relative position to the base vehicle and/or other aspects of their environment), determine an applicable set of signaling locations based on the localization, and autonomously maneuver to a respective signaling location.

The emergency signaling drones 104, 106, and 108 may be configured to communicate with one another to determine the set of applicable signaling locations based on the stop location of the base vehicle (e.g., based on whether the base vehicle is stopped on a divided one-way highway, near a curve, a crest of a hill, or another obstruction to view, or stopped at any other location other than an approved stop location). Once the emergency signaling drones 104, 106, and 108 determine the set of applicable signaling locations, each may maneuver to a signaling location to which it is assigned based on the applicable set of signaling locations. For instance, each of the emergency signaling drones 104, 106, and 108 may be configured to navigate to a predetermined location relative to the base vehicle given a determined set of signaling locations (e.g., one of the vehicles may be assigned to a location 10 feet behind the base vehicle, one may be assigned to a location 100 feet behind the base vehicle, and another may be assigned to a location 200 feet behind the base vehicle for one of the sets of signaling locations). The emergency signaling drones 104, 106, and 108 may be configured to communicate with one another (e.g., using an onboard communication unit 210 shown in FIG. 2) to determine which emergency signaling drone is best suited to maneuver to each respective location given an applicable set of signaling locations. Instead of maneuvering to a predetermined location given an applicable set of signaling locations, the emergency signaling drones may instead communicate to determine which emergency signaling drone will position itself at each of the respective locations of the applicable set of locations. This may enable the emergency signaling drones to account for characteristics of the signaling vehicles that make them better suited for a given location. For instance, if one or more of the emergency signaling drones has lower power (e.g., a low battery), the vehicles can communicate to assign those respective vehicles with low power to signaling locations relatively closer to the base vehicle (e.g., 10 or 100 feet from the base vehicle rather than 200 feet).

In some embodiments, at least one of the plurality of emergency signaling drones 104, 106, and/or 108 is a master signaling drone. The master signaling drone may be configured to serve as the main point of contact with the base vehicle 102, for instance, by routing instructions from the base vehicle 102 to the other emergency signaling drones (i.e., slave signaling drones). The master signaling drone may be configured to assign itself and the slave signaling drones to respective signaling locations given an applicable set of signaling locations received from the base vehicle 102, or, if the base vehicle is unable to transmit a local map, localization information, and/or the applicable set of signaling locations, the master signaling drone may be configured to determine which set of signaling locations is applicable given its own location and/or the location of the base vehicle (determined based on sensor data obtained via sensors on the master signaling drone, or, as described above, based on sensor data obtained from sensors positioned on the base vehicle 102 in communication with the master signaling drone) and transmit the applicable set of signaling locations to the slave signaling drones. The slave signaling drones may be configured to autonomously maneuver to predetermined signaling locations based on the applicable set of signaling locations received from the master signaling drone. Alternatively, the master signaling drone may dynamically assign the slave signaling drones to respective signaling locations based on the applicable set of signaling locations, for instance, to account for battery status or other conditions such as if one of the signaling vehicles is better suited for a given terrain than another (e.g., if one vehicle is an aerial vehicle and another is a ground-based vehicle), or if one vehicle has a damaged wheel, tread, etc.

In some embodiments, the master signaling drone may be configured to determine navigation instructions for each of the respective signaling vehicles (e.g., for itself and the slave signaling drones) to their respective signaling locations and respectively transmit navigation instructions to each of the slave signaling drones. In some embodiments, the master signaling drone may at least partially control (e.g., transmit control signals) to one or more of the slave signaling drones to maneuver the slave signaling drones to a respective signaling location. The master signaling drone may be configured to determine the navigation instructions based on perception sensor information obtained using the navigation system on the master signaling drone and/or based on perception sensor information received from the base vehicle 102. The navigation instructions may include a predefined path to the signaling location, a travel velocity, and/or a permissible range of deviation from the predefined path (e.g., to avoid obstacles such as other vehicles on the road and/or to stay within a lane). The slave signaling drones may each be configured to override the navigation instructions transmitted from the master signaling drone as needed based on sensor data obtained using their own onboard navigation systems while maneuvering to their respective assigned signaling locations.

In some embodiments, if one of the emergency signaling drones is damaged, one or more additional emergency vehicles stored on the base vehicle 102 may be configured to replace it. The replacement emergency signaling drone may be deployed from the base vehicle 102 and may receive information regarding the assigned signaling location of the damaged emergency signaling drone. The replacement signaling drone may be configured to maneuver to the signaling location assigned to the damaged signaling drone using its onboard navigation system. The information may be transmitted to the replacement signaling drone by the base vehicle and/or any of the other emergency signaling drones upon the base vehicle and/or any of the other emergency signaling drones determining that one of the emergency signaling drones is damaged. If the master signaling drone is damaged, one of the remaining emergency signaling drones may be promoted to the master signaling drone, and, if a replacement drone is available, an additional slave signaling drone may be deployed from the base vehicle. The newly deployed vehicle may alternatively be designated the new master signaling drone. If no replacement emergency signaling drones are available, the remaining undamaged drones may communicate with one another, the base vehicle 102, and/or a remote server to determine how to proceed. For instance, the remaining undamaged drones may communicate with one another, the base vehicle 102, and/or a remote server to determine whether and how to reposition themselves to best signal the emergency condition to other vehicles on the roadway in the absence of the damaged drone.

The plurality of emergency signaling drones 104, 106, and 108 may be respectively configured to maneuver to their designated signaling location within a predefined time period. For example, the plurality of emergency signaling drones may be respectively configured to maneuver to their designated signaling location within at most 10 minutes, at most 9 minutes, at most 8 minutes, at most 7 minutes, at most 6 minutes, at most 5 minutes, at most 4 minutes, at most 3 minutes, at most 2 minutes, and/or at most 1 minute from the time the base vehicle detects the emergency condition and/or from the time at which the base vehicle comes to a stop.

Each of the plurality of emergency signaling drones 104, 106, and 108 may activate a respective emergency signaling assembly 110, 112, and 114, for instance, upon deployment, while in transit to a signaling location, and/or upon reaching a respective signaling location. The emergency signaling assemblies may respectively include, for instance, one or more lights or light assemblies, flares, reflective surfaces, speakers (e.g., for generating auditory emergency signals), or any other visual or auditory mechanism suited for serving as an emergency signal. The plurality of emergency signaling drones 104, 106, and 108 may be configured to enter a low-power mode upon activation of the emergency signaling assemblies to conserve energy resources. Entering the low-power mode may include disabling one or more systems of the plurality of emergency signaling drones other than the emergency signaling assembly. A communication link communicatively coupling at least one of the plurality of emergency signaling drones with the base vehicle may be maintained in the low-power mode. A communication link communicatively coupling each of the plurality of emergency signaling drones may additionally, or alternatively, be maintained in the low-power mode.

Finally, the plurality of emergency signaling drones 104, 106, and 108 may be configured to maneuver back to the base vehicle 102 (e.g., back to storage compartment 107) from their signaling location upon receiving a return signal from the base vehicle 102, remote server (e.g., remote server 208), or from one of the other emergency signaling drones, for instance, from a drone serving as the master signaling drone. The emergency signaling drones may be configured to remain at their respective signaling locations until a return signal is received. Upon receiving the return signal, the emergency signaling drones 104, 106, and 108 may utilize their onboard navigation systems to autonomously maneuver back to the base vehicle 102. In some embodiments, the base vehicle 102 or master signaling drone may at least partially control one or more of the drones 104, 106, and/or 108 to maneuver the one or more drones back to the base vehicle 102. In some embodiments, the emergency signaling drones 104, 106, and 108 may maneuver to a safe location off the roadway (e.g., on the shoulder) to await retrieval upon receipt of a signal indicating to disperse from their respective emergency signaling location (e.g., instead of a return signal). This feature may be desirable, for instance, if navigation back to the base vehicle is impossible for one or more of the emergency signaling drones.

FIG. 2 illustrates a block diagram 200 of an exemplary architecture of an emergency signaling drone 204 that may be utilized to carry out various functionalities described above with reference to the system 100 of FIG. 1 according to some embodiments. As described above, each of the emergency signaling drones may be configured to be deployed from a base vehicle and to maneuver to a particular signaling location at a predefined distance from the base vehicle. To accomplish this, the emergency vehicles may be equipped with a variety of components for collecting information about their surroundings, processing the information to maneuver to the signaling location, and communicating with other devices, including the base vehicle and other emergency signaling drones, as described in additional detail below.

The emergency signaling drone 204 may include one or more sensors 214. The sensors 214 may be mounted on various strategic locations on the emergency signaling drone. For instance, one or more sensors 214 may be positioned on the front of the drone, sides of the drone, rear of the drone, and/or top of the drone. The sensors may include one or more LIDAR sensors, one or more radar sensors, one or more infrared sensors, one or more GPS sensors, one or more inertial measurement unit (IMU) sensors, one or more cameras, or any combination thereof. Sensor data from the sensors may be transmitted (e.g., via wired or wireless communication protocols) to the onboard computing unit 212 (e.g., part of an onboard computing system). The onboard computing unit 212 may be configured to process data acquired via the one or more sensors and execute control algorithms for controlling the emergency signaling drone 204. For instance, computing unit 212 may be configured to transmit commands to control/power electronics unit 216 to cause the emergency signaling drone 204 to maneuver to a respective signaling location based on the raw data sensor data and/or processed data.

The control/power electronics unit 216 may be configured to manage the electrical functions of the emergency signaling drone 204 (e.g., by controlling electric motor(s), converting DC battery power to AC for motor operation, and/or regulating the distribution of power to different components of the emergency signaling drone 204. The control/power electronics unit 216 executes commands (e.g., in the form of electrical signals) issued by computing unit 212 to cause the emergency signaling drone to maneuver to an assigned signaling location and/or back to the base vehicle, to activate an emergency signaling assembly, to enter a low-power mode, and so on. The control/power electronics unit 216 may also send feedback signals to the computing unit 212 indicative of the state of, for instance, the electrical motors 218, electric battery 220, and/or the emergency signaling assembly 222, each of which may be mounted on a chassis 224 of the emergency signaling drone 204, and which the computing unit may utilize to adjust the command signals it provides to the control/power electronics unit 216.

Computing unit 212 may additionally be communicatively coupled to an onboard communication unit 210. Communication unit 210 may be configured to send and receive wireless communications (e.g., according to any known wireless communication protocols) to, for instance, the base vehicle 202, other deployable emergency signaling drones 206, a remote server 208, or any combination thereof. Communication unit 210 may be configured to receive data and/or commands (e.g., local maps, localization information, assigned signaling locations, navigation instructions, etc.) from the base vehicle 202, other deployable emergency signaling drones 206, and/or a remote server 208. Communication unit 210 may be configured to transmit data and/or commands to other emergency signaling drones 206 and/or the base vehicle 202. The data and/or commands from the base vehicle 202 or other deployable emergency signaling drones 206 may be transmitted from the communication unit 210 to the computing unit 212, which the computing unit 212 may process to execute various tasks (e.g., maneuvering the emergency signaling to an assigned location such as a signaling location or back to the base vehicle)

Figure 3:
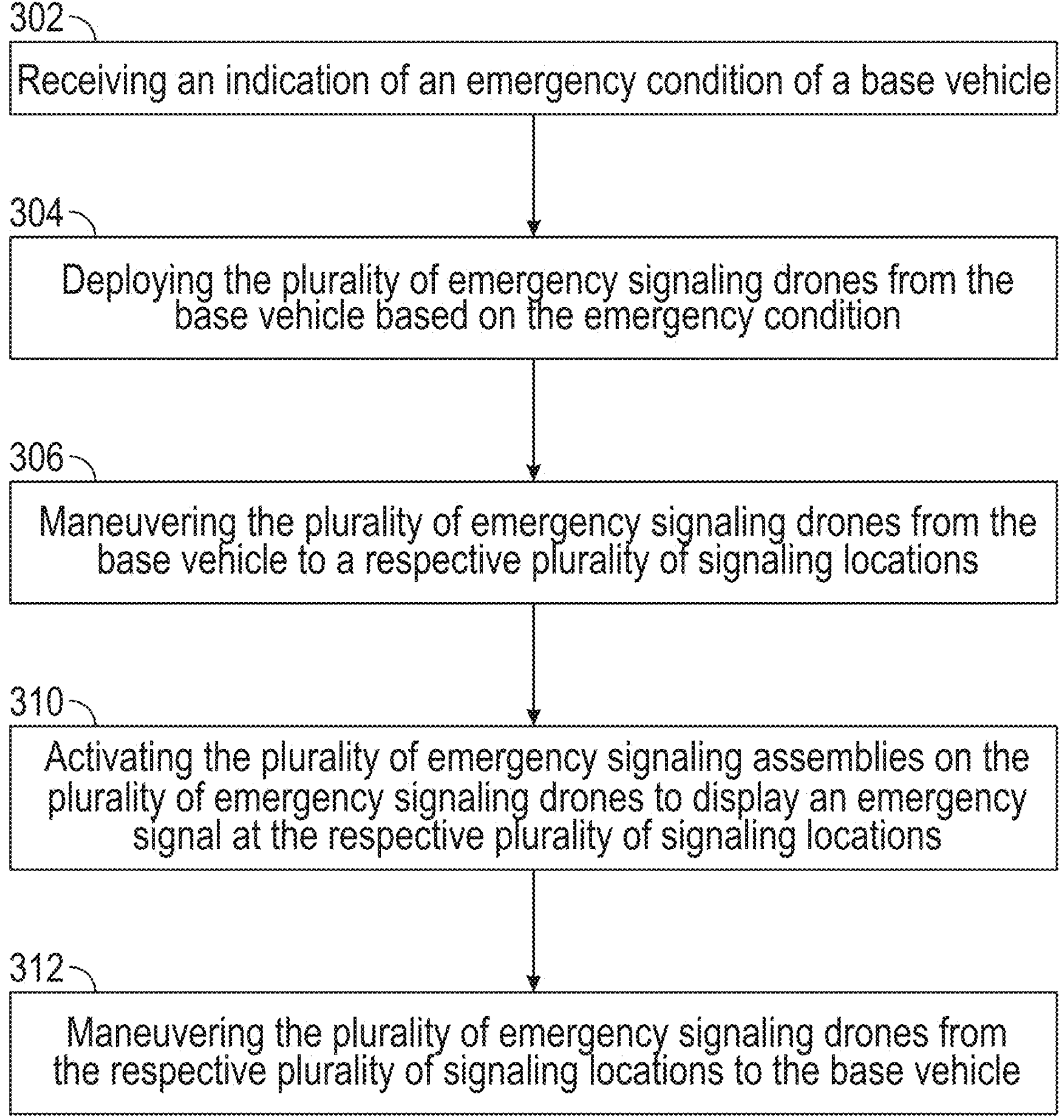
FIG. 3 illustrates an exemplary method for deploying a plurality of autonomous emergency signaling drones from a base vehicle according to some embodiments.

FIG. 3 illustrates an exemplary process 300 for deploying a plurality of emergency signaling drones from a base vehicle, according to some embodiments. In some embodiments, process 300 may be performed by system 100 and may include an emergency signaling drone such as emergency signaling drone 204, as described above with reference to FIGS. 1 and 2. The base vehicle may be an autonomous vehicle or human operated vehicle (or a vehicle that is partially autonomous and partially human operated). When the base vehicle encounters an emergency condition, autonomous ground-based and/or aerial emergency signaling drones may be deployed that are configured to display emergency lights or reflective surfaces at a variety of locations surrounding the base vehicle to alert other drivers on the roadway to the base vehicle's location. Process 300 is performed, for example, using one or more electronic devices implementing a software platform. In some examples, process 300 is performed using one or more electronic devices. In some embodiments, process 300 is performed using a client-server system, and the blocks of process 300 are divided up in any manner between the server and one or more client devices. Thus, while portions of process 300 are described herein as being performed by particular devices, it will be appreciated that process 300 is not so limited. In process 300, some blocks are, optionally, combined, the order of some blocks is, optionally, changed, and some blocks are, optionally, omitted. In some examples, additional steps may be performed in combination with the process 300. Accordingly, the operations as illustrated (and described in greater detail below) are exemplary by nature and, as such, should not be viewed as limiting.

At block 302, the process 300 includes receiving, for instance, by an exemplary system (e.g., one or more electronic devices) performing process 300, an indication of an emergency condition of a base vehicle. The indication of an emergency condition may be based on a fault (e.g., vehicle component failure) detected by one or more fault detection sensors on the base vehicle and/or based on the base vehicle being stopped. An emergency condition may not always be detected when the base vehicle is stopped, for instance, an emergency condition may be detected when the base vehicle is stopped at a location of a roadway other than one or more approved stop locations, but not detected when the base vehicle is stopped at an approved stop location. The one or more approved stop locations may include a traffic signal location, an origin location (e.g., of a travel route), a destination location, a parking lot, a charging station, a refueling location, and/or other predefined approved stop location. In other words, the exemplary system may be configured not to deploy emergency signaling drones when the base vehicle is stopped at a traffic light, or parked in a parking lot, and so on. If the base vehicle is stopped at an approved stop location, it may not be desirable to deploy the emergency signaling drones because there is likely no emergency for which the emergency signaling drones should be deployed. The location of a roadway other than one or more approved stop locations, on the other hand, may include a shoulder of a highway, a traveled portion of a highway, or any other location where the vehicle is stopped other than for necessary traffic stops. In such cases, the base vehicle may be stopped in close proximity to moving traffic in a location where vehicles are not ordinarily stopped. Accordingly, the base vehicle being stopped may pose a traffic hazard, and thus the system may detect an emergency condition.

As noted, the indication of the emergency condition may be based on failure of one or more components of the base vehicle. The failure of the one or more components of the base vehicle may include a sensor failure, a software failure, a communications link failure, a mechanical failure, an electrical failure, or any combination thereof. Sensor failures, for instance, may include obstruction of a sensor, physical damage to a sensor, sensor fusion error, adverse weather conditions, etc. Software failures, for instance, may include object detection errors, algorithmic limitations, GPS or other navigation system errors, etc. Mechanical failures may include, for instance, flat tires, brake malfunctions, axle damage, etc. Electrical failures may include, for instance, short circuits, dead batteries, etc. One skilled in the art would understand that the aforementioned component failures are meant to be exemplary, and a variety of other component failures may form part of an emergency condition detected according to the process 300, leading to deployment of the emergency signaling drones as described below. If the system receives an indication of a failure of one or more components of the base vehicle and the vehicle is stopped at an approved stop location, the system may still determine that there is an emergency condition based on the failed component of the vehicle. If the base vehicle is traveling and detects a failure of one or more components of the base vehicle, the vehicle may initiate a vehicle stop sequence (e.g., when the base vehicle is an autonomous vehicle such as a fully autonomous vehicle or partially autonomous vehicle) or, if the vehicle is human operated, may instruct an operator of the vehicle to stop the vehicle. The vehicle stop sequence may include identifying a safe stop location. The stop location may be a road shoulder, an adjacent lane, a current travel lane, or any other location the system determines is a safe stop location. The system may then cause the vehicle to navigate to and stop at the identified safe stop location or instruct the operator to navigate to the approved stop location. Once the base vehicle is stopped, the emergency signaling drones may be deployed, as described below.

The indication of the emergency condition may additionally, or alternatively, be based on a detected input received from an operator of the base vehicle. For example, an operator located either within the base vehicle or at a remote location away from the base vehicle (e.g., a control station for a fleet of autonomous vehicles) may provide an input via an interface associated with the system. The input may be indicative of an emergency condition of the base vehicle. For instance, the input may cause activation of the hazard lights of the base vehicle. The input may cause the system to detect an emergency condition even in the absence of the vehicle being stopped at a location other than an approved stop location and/or a failure of one or more components of the base vehicle.

At block 304, the process 300 includes deploying a plurality of emergency signaling drones from the base vehicle based on the detected emergency condition. As described above, the emergency signaling drones may include a plurality of autonomous drones stored on the base vehicle. The plurality of emergency signaling drones may include autonomous ground-based drones, autonomous aerial drones, or any combination thereof. For example, the emergency signaling drones may be wheeled drones, tracked drones, legged drones, multi-rotor drones, single-rotor drones, fixed-wing drones, fixed-wing hybrid vertical take-off and landing drones, or any other autonomous drone configured to be stored in or on the base vehicle (e.g., in a storage compartment of a cabin of an autonomous semi-truck). Deploying the plurality of emergency signaling drones from the base vehicle may include releasing the plurality of emergency signaling drones from a storage compartment of the base vehicle, for instance, by lowering a ramp from the storage compartment, and/or opening a door of the storage compartment, or otherwise releasing the emergency signaling drones from a storage compartment of the base vehicle. A system performing the process 300 may be configured to automatically deploy the emergency signaling drones upon detection of an emergency condition (e.g., by transmitting a signal to a controller of the base vehicle that instructs the controller to release the emergency vehicles from the storage compartment).

The storage compartment may be positioned underneath a tractor of the base vehicle, above a tractor of the base vehicle, in a cabin of the base vehicle, on a roof of the base vehicle, and/or in a fairing of the base vehicle. The base vehicle may include more than one storage compartment. For example, multiple emergency signaling drones may be stored within the same storage compartment, or each emergency signaling drone may be stored in a separate storage compartment. One or more emergency signaling drones may additionally, or alternatively, be mounted on an external surface of the base vehicle (e.g., on the roof of the cabin of an autonomous semi-truck or the roof of any other autonomous vehicle), on the chassis (or otherwise on the undercarriage of the vehicle), or otherwise mounted on the vehicle in a manner other than within a closed storage compartment. As noted above, the emergency signaling drones may be connected to a power supply when stored to charge the respective drones.

At block 306, the process 300 includes maneuvering the plurality of emergency signaling drones from the base vehicle to a respective plurality of signaling locations. The plurality of signaling locations may be determined based upon a location of the base vehicle and/or may include a plurality of locations at a plurality of predefined distances from the base vehicle. For instance, the plurality of signaling locations may include a first signaling location at a predefined distance in front of the base vehicle, a second signaling location at a first predefined distance behind the base vehicle, and a third signaling location at a second predefined distance behind the base vehicle. In some embodiments, the plurality of signaling locations may include a first signaling location at a first predefined distance behind the base vehicle, a second signaling location at a second predefined distance behind the base vehicle, and a third signaling location at a third predefined distance behind the base vehicle. In some embodiments, on divided highways, the signaling locations may be at 10, 100, and 200 feet behind the base vehicle. On two lane roads, the signaling locations may be at 100 feet ahead of the base vehicle and at 10 and 100 feet behind the base vehicle.

As described above with reference to system 100 of FIG. 1, the plurality of emergency signaling locations may be determined based on one or more characteristics of the roadway on which the base vehicle is stopped. The plurality of emergency signaling locations may include a first set of signaling locations which may be applicable to a first set of road characteristics, for instance, if the base vehicle is stopped upon the traveled portion or the shoulder of a divided or one-way highway. The first set may include, for instance, a signaling location at a distance of 200 feet in the direction toward approaching traffic (i.e., behind the vehicle) and a signaling location at a distance of 100 feet in a direction toward approaching traffic (i.e., behind the vehicle) in the center of the lane or shoulder occupied by the base vehicle. Additionally, the plurality of signaling locations may include a signaling location on the traffic side of the base vehicle within 10 feet of the rear of the base vehicle.

The plurality of emergency signaling locations may include a second set of signaling locations which may be applicable to a second set of road characteristics, for instance, if the base vehicle is stopped within 500 feet of a curve, a crest of a hill, or another obstruction to view. The second set may include, for instance, a location in the direction of the obstruction to view a distance of 100 feet to 500 feet from the stopped base vehicle so as to afford ample warning to other users of the highway. The second set may also include locations at one or more of the locations from the first set, described above, and the third set, described below.

The plurality of emergency signaling locations may include a third set of signaling locations which may be applicable to a third set of road characteristics, which may include any conditions not described above with respect to the first and second sets. The third set may include, for instance, (i) a signaling location on the traffic side of, and 4 paces (approximately 3 meters or 10 feet) from, the stopped base vehicle 102 in the direction of approaching traffic; (ii) a signaling location at 40 paces (approximately 30 meters or 100 feet) from the base vehicle in the center of the traffic lane or shoulder occupied by the base vehicle and in the direction of approaching traffic; and (iii) a signaling location at 40 paces (approximately 30 meters or 100 feet) from the stopped base vehicle in the center of the traffic lane or shoulder occupied by the base vehicle and in the direction away from approaching traffic.

The signaling locations to which each of the emergency signaling drones is assigned to maneuver to may be modified, for instance, if the assigned signaling location is unavailable and/or if one of the emergency signaling drones becomes damaged (e.g., in transit or while positioned at its signaling location). As an example, if three emergency signaling drones are deployed and positioned at respective signaling locations, and the emergency signaling drone closest to the base vehicle becomes damaged, a replacement drone may be deployed from the base vehicle and maneuver to the damaged vehicle's assigned location. If, however, the emergency signaling drone at the signaling location furthest from the base vehicle is damaged, then one or more of the emergency signaling drones already deployed to their signaling locations may be configured to switch locations and a replacement signaling drone may be deployed to their previous location in the manner that requires the least travel time for each of the respective emergency signaling drones. Additional details on the signaling locations and a variety of additional exemplary implementations for maneuvering the emergency signaling drones to signaling locations are provided below.

Each of the plurality of emergency signaling drones may respectively include a navigation system (e.g., as illustrated in FIG. 2) for maneuvering a respective drone of the plurality of emergency signaling drones to one of the first signaling location, the second signaling location, or the third signaling location. Each navigation system may respectively include one or more sensors and one or more computing systems for processing sensory information from the one or more sensors. For instance, as described above with reference to FIG. 2, each of the emergency signaling drones may include sensors 214 and a computing unit 212. The one or more sensors include a LIDAR sensor, a radar sensor, an infrared sensor, a GPS sensor, an inertial measurement unit (IMU) sensor, a camera, or any combination thereof. Sensor data from the sensors may be transmitted (e.g., via wired or wireless communication protocols) to the onboard computing system(s), which may in turn issue commands to one or more control units for controlling vehicle components. In some embodiments, the emergency signaling drones may be activated (e.g., via a signal from the base vehicle or remote server (e.g., central control system), for instance, indicating an emergency condition has been detected). As described above, one or more signaling drones may be activated by a master signaling drone of the emergency signaling drones, which may detect an emergency condition based on sensor data (e.g., sensors mounted on the base vehicle) or may receive an emergency condition signal from the base vehicle or remote server.

In some embodiments, the base vehicle may be configured to transmit (e.g., through wireless communication) the latest known local map and localization of the base vehicle. The base vehicle may transmit this information upon detection of the emergency condition, or periodically (e.g., at predefined time intervals), or both. Localization of the base vehicle may include the position of the base vehicle within its environment (e.g., relative to one or more objects detected using sensors of the base vehicle). The local map may include a geographic map including roadways, landmarks, buildings, etc. in proximity to the base vehicle determined based on GPS data of the base vehicle. As noted, the base vehicle may be configured to periodically transmit the local map and localization information at a series of predetermined time intervals such that the emergency signaling drones may have a relatively up-to-date local map and localization of the base vehicle regardless of whether the emergency condition renders the base vehicle incapable of transmitting the local map and localization information once the base vehicle is stopped. For instance, the base vehicle may be configured to transmit the local map and localization information at least every millisecond, every second, every 5 seconds, every 10 seconds, or any other predefined time interval. The local map and localization information from the base vehicle may be generated using sensor data obtained by one or more sensors on the base vehicle.

The information transmitted from the base vehicle may include information regarding characteristics of the base vehicle stop location such that the emergency signaling drones can determine a set of signaling locations. In some embodiments, the information transmitted from the base vehicle may simply include an applicable set of signaling locations. As described above, the set of signaling locations may be based on characteristics of the roadway. For instance, a first set of signaling locations may be associated with a divided or one-way highway, a second set of signaling locations may be associated with a scenario in which the base vehicle is stopped within 500 feet of a curve, a crest of a hill, or another obstruction to view, and a third set of signaling locations may be associated with all other scenarios. Additionally, or alternatively, the information from the base vehicle may include instructions assigning each of the emergency signaling drones to one of a plurality of signaling locations (e.g., a specific signaling location within an applicable set). The emergency signaling drones may be configured to autonomously maneuver to one of the signaling locations based on the information transmitted from the base vehicle. The emergency signaling drones may additionally utilize the received local map and localization information to determine a navigation plan to maneuver to their respective signaling locations, and maneuver to a respective location using their onboard navigation systems. In some embodiments, as described above, the base vehicle may at least partially control one or more of the emergency signaling drones to maneuver the one or more drones to a respective signaling location.

In some embodiments, for instance, if the base vehicle is unable to transmit the local map, localization information, and/or information associated with the applicable set of signaling locations to the emergency signaling drones (e.g., due to the severity of the failure on the base vehicle), the emergency signaling drones may be configured to determine which set of signaling locations is applicable and maneuver to their respective signaling locations using their onboard sensing and computing resources. For example, the plurality of emergency signaling drones may be configured to perform their own localization upon deployment (e.g., to determine their relative position to the base vehicle and/or other aspects of their environment). The emergency signaling drones may be configured to communicate with one another to determine the set of applicable signaling locations based on their respective locations and/or based on the stop location of the base vehicle (e.g., based on whether the base vehicle is stopped on a divided one-way highway, near a curve, a crest of a hill, or another obstruction to view, or stopped at any other location other than an approved stop location). Once the emergency signaling drones determine the set of applicable signaling locations, each may maneuver to a signaling location to which it is assigned based on the applicable set of signaling locations. For instance, each of the emergency signaling drones may be preconfigured to navigate to a predetermined location relative to the base vehicle given a determined set of signaling locations (e.g., one of the vehicles may be assigned to a location 10 feet behind the base vehicle, one may be assigned to a location 100 feet behind the base vehicle, and another may be assigned to a location 200 feet behind the base vehicle for one of the sets of signaling locations).

In some embodiments, the emergency signaling drones may be configured to communicate with one another to determine which emergency signaling drone is best suited to maneuver to each respective location. Instead of maneuvering to a predetermined location given an applicable set of signaling locations, the emergency signaling drones may instead communicate to determine which emergency signaling drone will position itself at each of the respective locations of the set of locations. This may enable the emergency signaling drones to account for issues or characteristics of the signaling drones that make them better suited for a given location. For instance, if one or more of the emergency signaling drones has lower power (e.g., a low battery), the vehicles can communicate to assign those respective vehicles with low power to signaling locations relatively closer to the base vehicle (e.g., 10 or 100 feet from the base vehicle rather than 200 feet). The emergency signaling drones may also communicate with one another for a variety of other purposes, for instance, to call a replacement signaling drone if one of the emergency signaling drones is damaged or otherwise cannot successfully activate an emergency signaling assembly at its assigned signaling location (e.g., if an emergency signaling drone encounters a secondary emergency condition, as described below).

In some embodiments, at least one of the plurality of emergency signaling drones is a master signaling drone. The master signaling drone may be configured to serve as the main point of contact with the base vehicle (e.g., routing instructions from the base vehicle to slave signaling drones). The master signaling drone may be configured to assign itself and one or more of the slave signaling drones to respective signaling locations given an applicable set of signaling locations, local map, and/or localization received from the base vehicle, or, the master signaling drone may be configured to determine which set of signaling locations is applicable given the location of the base vehicle (determined based on sensor data obtained via sensors on the master signaling drone) and transmit the applicable set of signaling locations to the slave signaling drones. Thereafter, the slave signaling drones may be configured to maneuver to predetermined signaling locations based on the applicable set of signaling locations received from the master signaling drone. Alternatively, the master signaling drone may dynamically assign the slave signaling drones to respective signaling locations based on the applicable set of signaling locations, for instance, to account for battery status or other conditions such as if one of the signaling drones is better suited for a given terrain than another (e.g., if one vehicle is an aerial vehicle and another is a ground-based vehicle), or if one vehicle has a damaged wheel, tread, etc.

In some embodiments, the master signaling drone may be configured to determine navigation instructions for each of the respective signaling drones (e.g., for itself and the slave signaling drones) to their respective signaling locations and respectively transmit navigation instructions to each of the slave signaling drones. The master signaling drone may be configured to determine the navigation instructions based on sensory information obtained using the navigation system on the master signaling drone and/or based on information received from the base vehicle. The navigation instructions may include a predefined path to the signaling location, a travel velocity, and/or permissible range of deviation from the predefined path (e.g., to avoid obstacles such as other vehicles on the road and/or to stay within a lane). The slave signaling drones each may be configured to override the navigation instructions transmitted from the master signaling drone as needed based on sensor data obtained using their own onboard navigation systems while maneuvering to their respective assigned signaling locations.

In some embodiments, the process 300 may include detecting a secondary emergency condition of one or more of the plurality of emergency signaling drones. The secondary emergency condition may include any condition that renders one or more of the emergency signaling drones unable to reach its respective signaling location, activate a signaling assembly (as described below with reference to block 310), transmit or receive communications, or otherwise perform a necessary task. If a secondary emergency condition is detected, the process 300 may optionally include deploying one or more additional emergency signaling drones to replace the one or more emergency signaling drones experiencing the secondary emergency condition. The replacement emergency signaling drone may be deployed from the base vehicle (e.g., by a signal received from the base vehicle, one or more of the other emergency signaling drones, and/or a remote server) and may receive information regarding the assigned signaling location of the damaged emergency signaling drone (e.g., from the base vehicle, one or more of the other emergency signaling drones, and/or a remote server). The replacement emergency signaling drone may be configured to maneuver to the signaling location assigned to the damaged signaling drone using its onboard navigation system. If one of the emergency signaling drones is serving as a master signaling drone, and the master signaling drone is damaged, one of the remaining emergency signaling drones may be promoted to the master signaling drone, and an additional slave signaling drone may be deployed from the base vehicle. In some embodiments, the newly deployed vehicle may be designated as the new master drone. If no replacement drones are available, the one or more undamaged emergency signaling drones may communicate with one another, the base vehicle, and/or a remote server to determine how to proceed. For instance, the one or more undamaged emergency signaling drones may communicate with one another, the base vehicle, and/or a remote server to identify a new master signaling drone and/or to determine whether to reposition to best signal the emergency condition to other vehicles in the absence of the damaged emergency signaling drone.

The plurality of emergency signaling drones may be respectively configured to maneuver to their designated signaling location within a predefined time period. For example, the plurality of emergency signaling drones may be respectively configured to maneuver to their designated signaling location within at most 10 minutes, at most 9 minutes, at most 8 minutes, at most 7 minutes, at most 6 minutes, at most 5 minutes, at most 4 minutes, at most 3 minutes, at most 2 minutes, and/or at most 1 minute, from the time the base vehicle detects the emergency condition and/or from the time at which the base vehicle comes to a stop.

At block 310, the process 300 includes activating a plurality of emergency signaling assemblies on the plurality of emergency signaling drones to display an emergency signal at the respective plurality of signaling locations. Activating the plurality of emergency signaling assemblies on the plurality of emergency signaling drones may include activating at least one light on each of the emergency signaling assemblies. Additionally, or alternatively, activating the plurality of emergency signaling assemblies on the plurality of emergency signaling drones may include igniting a fusee flare, igniting a liquid-burning flare, deploying a reflective triangle or other reflective surface, or any combination thereof at each of the respective signaling locations. To conserve power, the plurality of emergency signaling drones may each be configured to enter a low-power mode upon activating the plurality of emergency signaling assemblies. Entering the low-power mode may include disabling one or more systems of the plurality of emergency signaling drones other than the emergency signaling assembly. A communication link communicatively coupling at least one of the plurality of emergency signaling drones with the base vehicle may be maintained in the low-power mode. A communication link communicatively coupling each of the plurality of emergency signaling drones may be maintained in the low-power mode.

At block 312, process 300 may include maneuvering the plurality of emergency signaling drones from their respective plurality of signaling locations back to the base vehicle. The emergency signaling drones may be configured to utilize their onboard navigation systems to maneuver back to the base vehicle and back into the storage compartment of the base vehicle upon receiving a return signal (e.g., from the base vehicle, a remote server, and/or a master signaling drone). The emergency signaling drones may be configured to remain at their respective signaling locations until a return signal is received. In some embodiments, the emergency signaling drones may be configured to navigate to a safe location off the roadway (e.g., on the shoulder) to await retrieval upon receipt of a signal indicating to disperse from their respective emergency signaling location. This feature may be desirable, for instance, if navigation back to the base vehicle is impossible for one or more of the emergency signaling drones.

Figure 4:
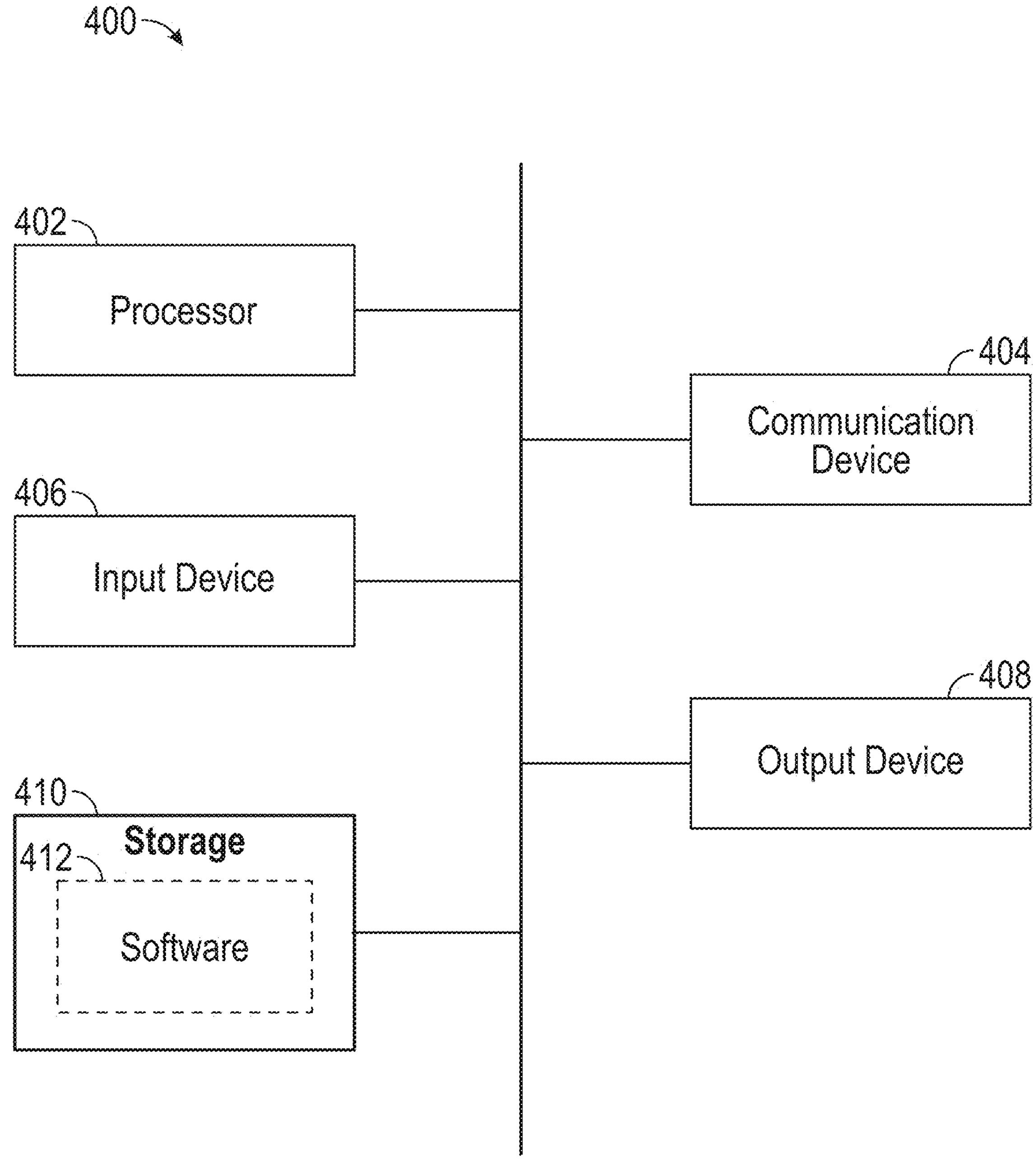
FIG. 4. illustrates an exemplary computing system according to some embodiments.

FIG. 4 depicts an exemplary computing device 400, in accordance with one or more examples of the disclosure. Device 400 can be a host computer connected to a network. Device 400 can be a client computer or a server. As shown in FIG. 4, device 400 can be any suitable type of microprocessor-based device, such as a personal computer, workstation, server, or handheld computing device (i.e., a portable electronic device) such as a phone or tablet. The device can include, for example, one or more of processors 402, input device 406, output device 408, storage 410, and communication device 404. Input device 406 and output device 408 can generally correspond to those described above and can either be connectable or integrated with the computer.

Input device 406 can be any suitable device that provides input, such as a touch screen, keyboard or keypad, mouse, or voice-recognition device. Output device 408 can be any suitable device that provides output, such as a touch screen, haptics device, or speaker.

Storage 410 can be any suitable device that provides storage, such as an electrical, magnetic, or optical memory, including a RAM, cache, hard drive, or removable storage disk. Communication device 404 can include any suitable device capable of transmitting and receiving signals over a network, such as a network interface chip or device. The components of the computer can be connected in any suitable manner, such as via a physical bus or wirelessly.

Software 412, which can be stored in storage 410 and executed by processor 402, can include, for example, the programming that embodies the functionality of the present disclosure (e.g., as embodied in the devices as described above).

Software 412 can also be stored and/or transported within any non-transitory computer-readable storage medium for use by, or in connection with, an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 410, that can contain or store programming for use by, or in connection with, an instruction execution system, apparatus, or device.

Software 412 can also be propagated within any transport medium for use by, or in connection with, an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by, or in connection with, an instruction execution system, apparatus, or device. The transport-readable medium can include, but is not limited to, an electronic, magnetic, optical, electromagnetic, or infrared wired or wireless propagation medium.

Device 400 may be connected to a network, which can be any suitable type of interconnected communication system. The network can implement any suitable communication protocols and can be secured by any suitable security protocols. The network can comprise network links of any suitable arrangement that can implement the transmission and reception of network signals, such as wireless network connections, T1 or T3 lines, cable networks, DSL, or telephone lines.

Device 400 can implement any operating system suitable for operating on the network. Software 412 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for deploying a plurality of emergency signaling drones from a base vehicle, the method comprising:

receiving an indication of an emergency condition of the base vehicle;

deploying the plurality of emergency signaling drones from the base vehicle based on the emergency condition;

maneuvering the plurality of emergency signaling drones from the base vehicle to a respective plurality of signaling locations; and activating a plurality of emergency signaling assemblies on the plurality of emergency signaling drones to display an emergency signal at the respective plurality of signaling locations, wherein the plurality of emergency signaling drones are configured to enter a low-power mode upon activating the plurality of emergency signaling assemblies.

2. The method of claim 1, wherein the plurality of signaling locations are determined based on a stop location of the base vehicle.

3. The method of claim 2, wherein each of the plurality of emergency signaling drones is configured to maneuver to a predefined signaling location of the determined plurality of signaling locations using an onboard navigation system.

4. The method of claim 1, wherein the plurality of emergency signaling drones are configured to navigate to one of the plurality of signaling locations based on a local map and localization information received from the base vehicle using an onboard navigation system.

5. The method of claim 1, wherein an emergency signaling drone of the plurality of emergency signaling drones is a master signaling drone configured to transmit navigation instructions to one or more other emergency signaling drones of the plurality of emergency signaling drones.

6. The method of claim 5, wherein the master signaling drone is configured to determine the navigation instructions based on sensory information obtained using one or more sensors on the master signaling drone.

7. The method of claim 1, comprising:

receiving an indication of a secondary emergency condition of one or more of the plurality of emergency signaling drones; and deploying one or more additional emergency signaling drones from the base vehicle to replace the one or more emergency signaling drones experiencing the secondary emergency condition.

8. The method of claim 7, wherein the secondary emergency condition comprises one or more of the emergency signaling drones not being capable of activating an emergency signaling assembly of the plurality of emergency signaling assemblies.

9. The method of claim 1, wherein the emergency condition comprises the base vehicle being stopped at a location of a roadway other than one or more approved stop locations, a failure of one or more components of the base vehicle, or any combination thereof.

10. The method of claim 1, wherein the emergency condition is detected by one or more fault detection sensors on the base vehicle.

11. The method of claim 1, wherein the indication of the emergency condition is based on an input received from an operator of the base vehicle.

12. The method of claim 1, wherein the base vehicle is an autonomous vehicle or a human operated vehicle.

13. The method of claim 1, wherein the plurality of emergency signaling drones comprise a plurality of autonomous drones stored on the base vehicle.

14. The method of claim 1, wherein activating the plurality of emergency signaling assemblies on the plurality of emergency signaling drones comprises activating at least one light on each of the emergency signaling assemblies.

15. The method of claim 1, wherein entering the low-power mode comprises disabling one or more systems of the plurality of emergency signaling drones other than the emergency signaling assembly.

16. The method of claim 1, wherein a communication link communicatively coupling at least one of the plurality of emergency signaling drones with the base vehicle is maintained in the low-power mode.

17. The method of claim 1, wherein a communication link communicatively coupling each of the plurality of emergency signaling drones to one another is maintained in the low-power mode.

18. A system for deploying a plurality of emergency signaling drones from a base vehicle, the system comprising one or more processors and memory storing one or more computer programs that include computer instructions, which when executed by the one or more processors, cause the system to:

receive an indication of an emergency condition of the base vehicle;

deploy the plurality of emergency signaling drones from the base vehicle based on the emergency condition;

maneuver the plurality of emergency signaling drones from the base vehicle to a respective plurality of signaling locations; and activate a plurality of emergency signaling assemblies on the plurality of emergency signaling drones to display an emergency signal at the respective plurality of signaling locations, wherein the plurality of emergency signaling drones are configured to enter a low-power mode upon activating the plurality of emergency signaling assemblies.

19. A non-transitory computer readable storage medium storing instructions for deploying a plurality of emergency signaling drones from a base vehicle, the instructions configured to be executed by one or more processors of a computing system to cause the system to:

receive an indication of an emergency condition of the base vehicle;

deploy the plurality of emergency signaling drones from the base vehicle based on the emergency condition;

maneuver the plurality of emergency signaling drones from the base vehicle to a respective plurality of signaling locations; and activate a plurality of emergency signaling assemblies on the plurality of emergency signaling drones to display an emergency signal at the respective plurality of signaling locations, wherein the plurality of emergency signaling drones are configured to enter a low-power mode upon activating the plurality of emergency signaling assemblies.

* * * * *